United States Patent
Inoue et al.

(10) Patent No.: US 8,288,687 B2
(45) Date of Patent: Oct. 16, 2012

(54) ARC WELDING ROBOT

(75) Inventors: Toshihiko Inoue, Minamitsuru-gun (JP);
Kazutaka Nakayama, Minamitsuru-gun (JP); Takatoshi Iwayama, Minamitsuru-gun (JP)

(73) Assignee: FANUC Ltd, Minamitsuru-gun, Yamanashi (JP)

( * ) Notice: Subject to any disclaimer, the term of this patent is extended or adjusted under 35 U.S.C. 154(b) by 300 days.

(21) Appl. No.: 12/488,760

(22) Filed: Jun. 22, 2009

(65) Prior Publication Data

US 2010/0032420 A1 Feb. 11, 2010

(30) Foreign Application Priority Data

Aug. 6, 2008 (JP) .................................. 2008-203549

(51) Int. Cl.
*B23K 9/00* (2006.01)

(52) U.S. Cl. .................. 219/136; 219/125.1; 219/137.9; 219/159; 901/1; 901/42; 700/245

(58) Field of Classification Search ............... 219/125.1, 219/137.31, 137.51, 137.7, 137.9; 318/568.16, 318/560, 567, 568.11; 901/1–13, 19–26, 901/27, 30–50, 15, 29; 395/1; 364/573; 414/730–735

See application file for complete search history.

(56) References Cited

U.S. PATENT DOCUMENTS

| | | | |
|---|---|---|---|
| 6,250,174 B1 * | 6/2001 | Terada et al. | 74/490.02 |
| 7,378,613 B2 | 5/2008 | Mishima et al. | |
| 2006/0278622 A1 | 12/2006 | Inoue et al. | |
| 2007/0017911 A1 * | 1/2007 | Mishima et al. | 219/125.1 |

FOREIGN PATENT DOCUMENTS

| | | | |
|---|---|---|---|
| JP | 64-011781 | * | 1/1989 |
| JP | 1011781 | | 1/1989 |
| JP | 08-155881 | * | 6/1996 |
| JP | 8-155881 | | 6/1996 |
| JP | 2006-007256 | | 1/2006 |
| JP | 2006-341283 | | 12/2006 |

OTHER PUBLICATIONS

Japanese Notice of Reasons for Rejection mailed Jun. 29, 2010 issued in Japanese Application No. 2008-203549 (including a partial translation thereof).

* cited by examiner

*Primary Examiner* — Tu B Hoang
*Assistant Examiner* — Thien S Tran
(74) *Attorney, Agent, or Firm* — Drinker Biddle & Reath LLP

(57) ABSTRACT

An arc welding robot having a welding wire conduit which has a bend radius above a certain level and arranged so that disadvantageous stress is not applied to the conduit by the motion of the robot arm. A conduit for a welding wire is inserted through a hole of a robot pedestal from the rear side of the robot, is supported by a second support member arranged on the pedestal, extends near the front side of a rotating body of the robot, and is supported by a first support member on the upper part of the rotating body while having a required minimum bend radius. The conduit after passing through the first support member is introduced to the rear side of the upper arm and is connected to a connector at the rear side of a wire feeder while having the required minimum radius, whereby the conduit presents a generally S-shape.

6 Claims, 11 Drawing Sheets

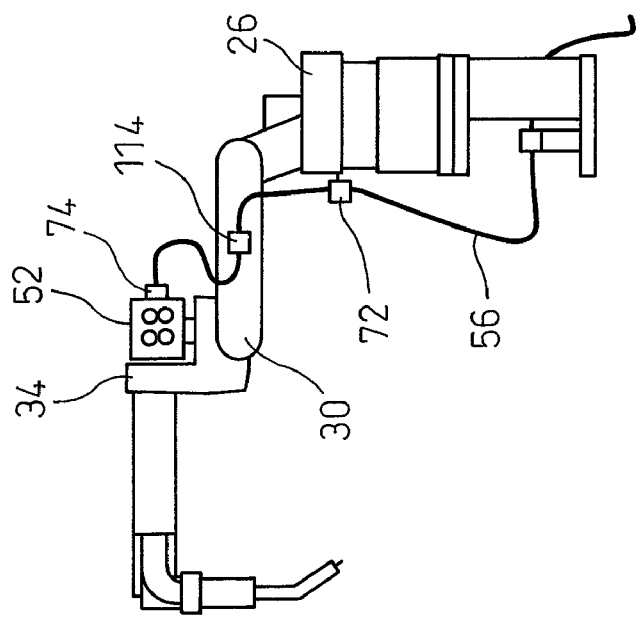
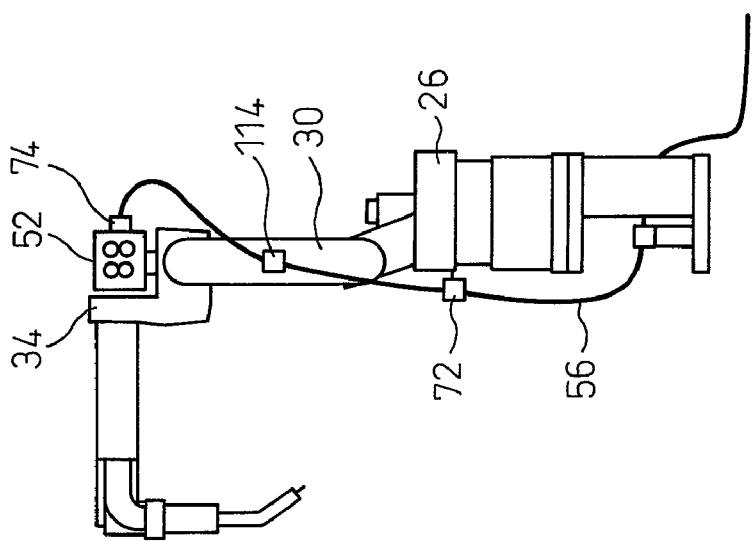
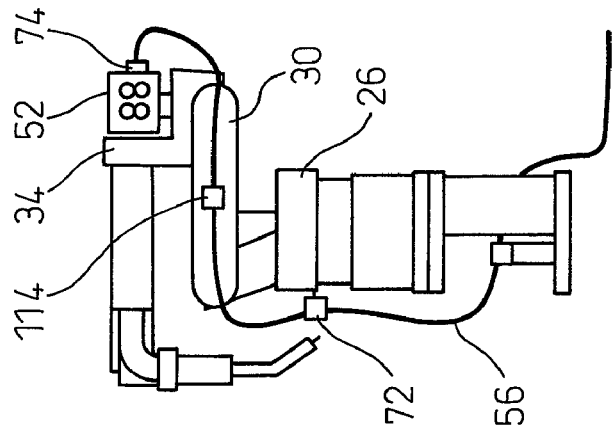

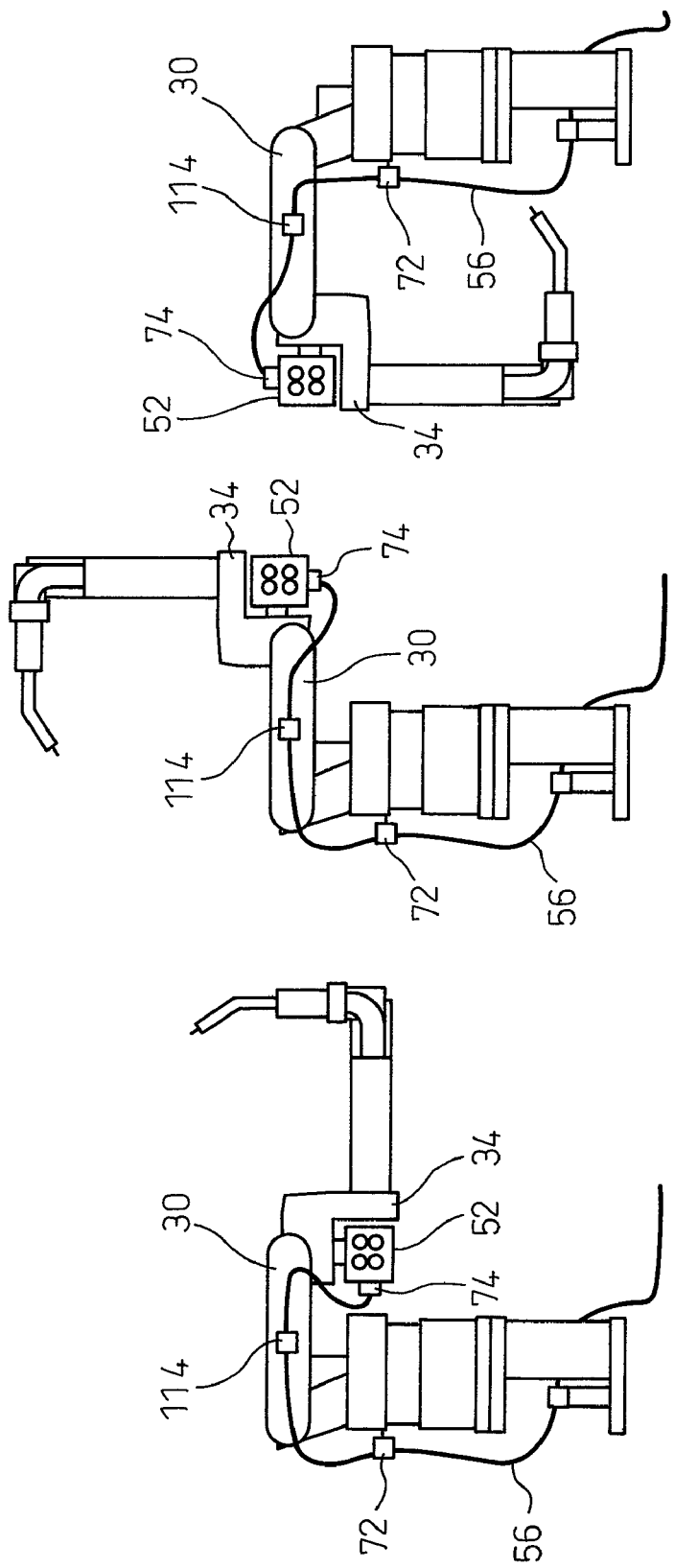

ARC WELDING ROBOT

RELATED APPLICATIONS

The present application claims priority from Japanese Patent Application No. 2008-203549, filed on Aug. 6, 2008, the entire contents of which are fully incorporated herein by reference.

BACKGROUND ART

1. Technical Field

The preset invention relates to a robot for arc welding.

2. Description of the Related Art

In an arc welding robot in recent years, a tube or wire required for welding is usually contained in a robot arm together with a control cable for a driving servomotor of the robot. However, since a welding wire is inserted in a welding wire conduit for connecting a wire feeding device and a wire supplying source, the conduit does not have flexibility. Further, since periodical maintenance is required to the conduit, it is difficult to contain the conduit in a narrow space of the robot arm. Therefore, in a conventional welding robot, it is necessary to arrange the conduit along the robot arm and fix some points of the conduit to the robot arm, so that the conduit may follow the motion of the robot arm. Such arrangement and fixing of the conduit is troublesome.

In recent years, a flexible welding wire conduit has been developed. Also, a technique has been developed, in which a robot having a robot arm is mounted on a pedestal, and a wire conduit is arranged along the robot arm and then is inserted in a hollow portion of a rotating part of the robot. For example, Japanese Unexamined Patent Publication No. 8-155881 discloses an industrial robot having a guide tube extending from a lower face of a base through an upper frame of a rotating part of the robot, and a hose or the like inserted into the guide tube, which feeds a welding core fiber to a processing tool.

In a conventional configuration, in the motion range required for an upper arm of the robot, for example, the upper arm is rotated toward the front side of the robot by 160 degrees or rotated toward the rear side of the robot by 90 degrees when the upper arm vertically extends relative to the install surface of the robot is set as a reference position (or orientation), the bend radius of the conduit for the welding wire may become smaller, whereby the welding wire within the conduit is strongly compressed against the inner surface of the conduit and the welding wire cannot be smoothly fed in the conduit. Since the welding wire is continuously fed in the conduit during welding operation, when the welding wire is strongly compressed against the conduit, the inner surface of the conduit may be damaged, in addition that the welding wire is not stably fed. Further, in the case that the robot has a forearm connected to the upper arm, when the forearm is folded forward or backward relative to the upper arm, the bend radius of the welding wire becomes smaller, whereby a problem similar to the above may occur.

Even when the welding wire is normally fed in the conduit, since powder generated by abrasion is in the wire conduit, it is necessary to periodically clean the inside of the conduit or replace the conduit. In order to pull-out the conduit from the hollow portion of the rotating body of the robot and return the conduit after cleaning or insert a new conduit to the hollow portion, it takes more time than if the conduit is arranged along the outside of the robot. In other words, when the conduit is inserted in the hollow portion of the rotating body, it is necessary to pull-out the conduit from the pedestal side near the install surface of the robot and then insert the conduit into a generally narrow hollow portion, which is troublesome.

SUMMARY OF THE INVENTION

Therefore, an object of the present invention is to provide an arc welding robot having a welding wire conduit which is easily arranged around the robot and has a bend radius above a certain level, so that disadvantageous stress cannot be applied to the conduit by the motion of the robot arm.

In order to resolve the above problems, according to the invention, there is provided an arc welding robot comprising: a robot pedestal; a rotating body rotatably mounted on the robot pedestal; an upper arm pivotally connected to the rotating body; a forearm which is pivotally connected to the upper arm; a wire feeding device for feeding welding wire, positioned at a rear part of the forearm; a welding torch for carrying out welding, attached to a front part of the forearm; a welding wire supply positioned around the robot; and a wire conduit connected between the welding wire supply and the wire feeding device, the welding wire being inserted into the wire conduit, wherein the robot pedestal comprises a bottom plate member arranged on an installation surface; two column members positioned on the bottom plate member and separated from each other by a certain distance; and a top plate member attached to upper ends of the two column members, the rotating body of the robot being fixed to the top plate member, wherein the two column members are connected to the bottom plate member and the top plate member at a place where is offset from a rotation axis of the rotating body of the robot, and the two column members cooperatively form a through hole, whereby the conduit extending from the welding wire supply may be fed from the offset side of the two column members to the center axis side of the rotating body through the through hole, and wherein the conduit extending through the through hole formed by the two column members passes through an area between the bottom plate member and the top plate member, and then is supported by a first support member arranged on the rotating body, whereby the conduit presents a generally S-shape from the area between the bottom plate member and the top plate member to the wire feeding device.

The conduit may be further supported by a second support member arranged on the robot pedestal. In this case, it is preferable that the first and second support members are configured to support the conduit so that the conduit may be moved in the axial direction thereof in each support member.

The conduit may be further supported by a third support member arranged on the upper arm of the robot. In this case, it is preferable that the third support member is configured to support the conduit so that the conduit may be moved in the axial direction thereof in the third support member.

It is preferable that the column members are positioned at a rear side of the bottom plate member relative to the rotation axis of the rotating body of the robot.

BRIEF DESCRIPTION OF THE DRAWINGS

The above and other objects, features and advantages of the present invention will be made more apparent from the following description of the preferred embodiments thereof, with reference to the accompanying drawings, wherein:

FIG. 11a is a view showing the motion of the conduit when the upper arm of the robot of FIG. 9 is rotated from a reference position thereof by −90 degrees;

FIG. 11b is a view showing the motion of the conduit when the upper arm of the robot of FIG. 9 is positioned at the reference position;

FIG. 11c is a view showing the motion of the conduit when the upper arm of the robot of FIG. 9 is rotated from the reference position by +90 degrees;

FIG. 12a is a view showing the motion of the conduit when the forearm of the robot of FIG. 9 is rotated from a reference position thereof by 180 degrees;

FIG. 12b is a view showing the motion of the conduit when the forearm of the robot of FIG. 9 is rotated from the reference position by +90 degrees;

FIG. 12c is a view showing the motion of the conduit when the forearm of the robot of FIG. 9 is rotated from the reference position thereof by −90 degrees;

FIG. 13b is a side view of the pedestal of FIG. 13a;

FIG. 13c is a top view of the pedestal of FIG. 13a; and

DETAILED DESCRIPTION

Figure 1:
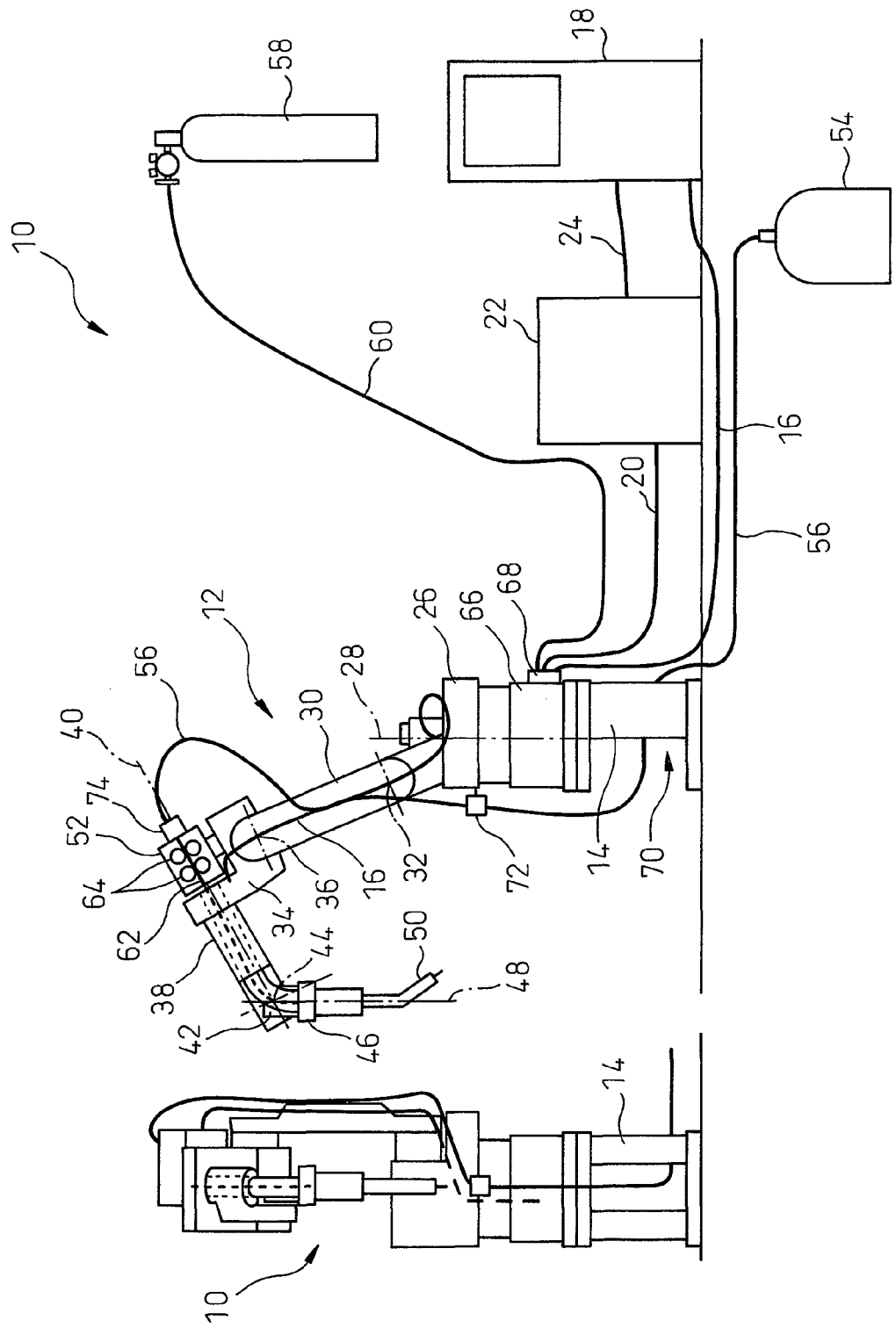
FIG. 1 shows front and side views of an arc welding robot according to the present invention.

FIG. 1 shows the configuration of an arc welding robot system 10 according to the invention. A robot 12 used in system 10 is an arc welding robot having six-degree-of-freedom by six axes and is mounted on a robot pedestal 14. Robot 12 is controlled corresponding to a command from a robot controller 18 connected to robot 12 via a robot control cable 16. A welding power supply 22 is connected to robot 12 via a feed cable 20, and power supply 22 is connected to robot controller 18 via a communication cable 24. Power supply 22 controls the welding operation based on a command from robot controller 18. A control cable, which is substantially integral with feed cable 20 or parallel to the feed cable, is arranged for controlling a welding wire feeding device as described below.

Robot 12 having six axes is normally has three base axes and three wrists. In this embodiment, the three axes correspond to a rotation axis 28 of a rotating body 26 rotatably mounted on pedestal 14, a pivot axis 32 of an upper arm 30 pivotally connected to rotating body 26, and a pivot axis 36 of a forearm 34 pivotally connected to upper arm 30. On the other hand, the three wrists correspond to a first axis 40 of a first wrist element 38 rotatably attached to a front end of forearm 34, a second axis 44 of a second wrist element 42 rotatably attached to a front end of first wrist element 38, and a third axis 48 of a third wrist element 46 rotatably attached to a front end of second wrist element 42. In the embodiment, first axis 40 is perpendicular to second axis 44, second axis 44 is perpendicular to third axis 48, and a welding torch 50 is attached to a front end of third wrist element 46.

Robot 12 has servomotors (not shown) and each of the servomotors is connected to each drive part of the six axes. Each servomotor is controlled based on a command from robot controller 18, whereby welding torch 50 may be moved to a target position where the torch may weld a predetermined part of an object to be welded.

Robot 12 has a wire feeding device or a wire feeder 52 arranged on forearm 34. When a motion command is fed to the servomotor, a welding wire, assist gas and welding current are supplied to welding torch 50 via wire feeder 52. Then, welding torch 50 can weld on object, according to a predetermined welding sequence, in synchronization with the motion of robot 12. As shown in FIG. 1, the welding wire is supplied from a wire supply source such as a welding wire drum 54 to the torch through a welding wire conduit (hereinafter, referred to as a conduit) 56. On the other hand, the assist gas is supplied from a gas supply source such as a gas canister 58 to the torch through a gas hose 60.

Wire feeder 52 has at least one pair (two pairs in this case) of wire feed rollers 64 configured to sandwich welding wire 62 supplied to wire feeder 52 through conduit 56, a wire feed motor (not shown) configured to receive a command from power source 22 via the feeder control cable and rotate wire feed rollers 64. By rotating wire feed rollers 64, the welding wire is fed to a torch cable (not shown) and finally to the front end of welding torch 50. The assist gas is fed from gas canister 58 to the torch cable via gas hose by opening a solenoid valve (not shown) arranged in wire feeder 52 according to a command from power supply 22. The fed assist gas is finally supplied to a nozzle portion at the front end of welding torch 50. The welding current from power supply 22 is fed to a chip (not shown) at the front end of welding torch 50 via feed cable 20 and the torch cable, so as to feed power to the welding wire. In the embodiment, the torch cable may be contained within forearm 34 or may be arranged along the outside of forearm 34.

Similarly to robot control cable 16, the wire feeder control cable, feed cable 20 and gas hose 60 as described above are connected to a distribution board 68 arranged at a rear side of a fixed base 66 which is a lower part of rotating body 26 of robot 12, by using a connector or a joint, and then withdrawn into the robot body. The withdrawn cable and hose are arranged along control cable 16 and pass through a hollow portion having of an axis same as rotation axis 28 of rotating body 26, and then pulled-out toward the upper part of rotating body 26. The pulled-out cable and hose are introduced to the lower lateral side of upper arm 30 and extend toward the upper lateral side of upper arm 30 in the longitudinal direction of the upper arm, and then connected to wire feeder 52 mounted on forearm 34. Control cable 16, including a motor control cable for each motor, is connected to distribution board 68 of base 66 by means of a connector or a joint, and then passes through the robot base and the rotating body together with the wire feeder control cable, power cable and the gas hose. After that, control cable 16 is arranged along the lateral side of the upper arm and then introduced to a front part of the forearm. In the way to the front part of the forearm, control cable 16 branches and the branched cables are connected to a rotating body driving motor (not shown) mounted on rotating body 26 and an upper arm driving motor. The other motor control cables are finally connected to motors mounted on forearm 34 and first wrist element 38, respectively.

Conduit 56 containing the welding wire is inserted into an opening 70 (FIG. 2) formed in the same side of pedestal 14 as distribution board 68 of the robot, and then withdrawn or pulled-out toward the front side of robot 12. The withdrawn conduit passes near the front side of rotating body 26 and supported by a first support member 72 arranged on rotating body 26. Conduit 56 then passes near the lateral side of upper arm 30, gently curved near the rear side of forearm 34, and finally connected to a connector 74 at the rear side of wire feeder 52. Welding wire 62 within conduit 56 is introduced between wire feed rollers 64, passes through the torch cable, and finally fed to the front end of welding torch 50.

Figure 2:
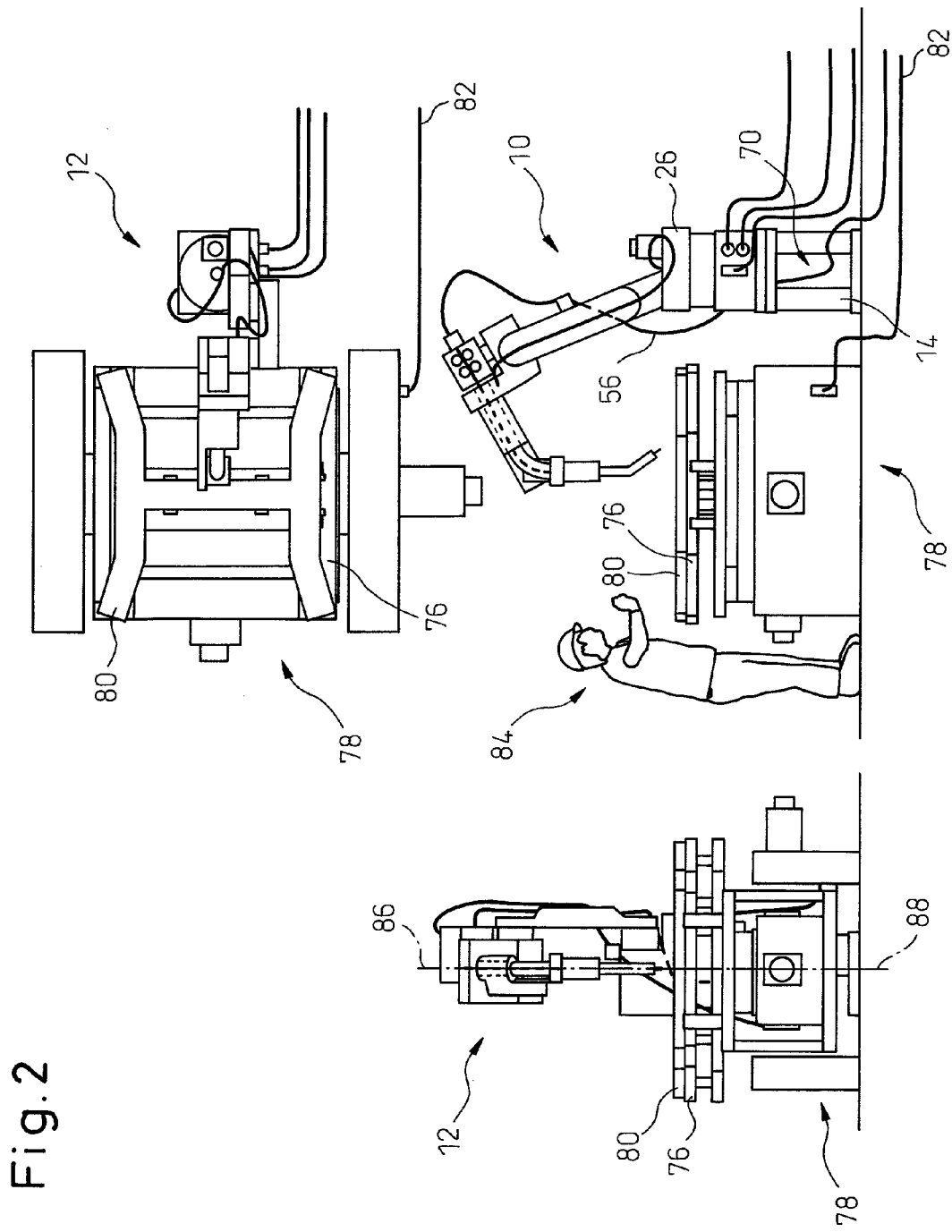
FIG. 2 shows front, side and top views of an arc welding robot system including the robot of FIG. 1 and a positioner.

FIG. 2 shows front, side and top views of an example of arc welding robot system 10 which is used in an actual welding field. Arc welding robot system 10 similar to that of FIG. 1 is combined with a positioner 78 having a welding jig 76 mounted thereon, and an object to be welded or a workpiece 80 is fixed to jig 76. In other words, robot system 10 combined with positioner 78 is constituted as a welding cell for carrying out the welding operation. Positioner 78 may be controlled, as an additional axis of the robot, by robot controller 18 (FIG. 1) via an additional axis control cable 82, so as to perform the welding operation cooperatively with the robot. Workpiece 80 is fixed to a predetermined position on welding jig 78 by means of a clamp and/or a locator in a reproducible manner. Further, the height of the fixed position of workpiece 80 is determined so that an operator 84 can easily set the workpiece to the jig.

Normally, the height of workpiece 80 and jig 76 is firstly determined and then the height of positioner 78 is automatically determined based on the height of workpiece 80 and jig 76. Robot 12 is normally mounted on pedestal 14 so that robot 12 can easily weld workpiece 80 fixed to positioner 78. When robot 12 is a multi-joint robot as in the embodiment, the operating range or the motion range of the robot is normally maximum at the height of a pivoting center 32 (FIG. 1) of upper arm 30. Therefore, considering that taking welding torch 50 welds the workpiece in the downward orientation, the height of robot pedestal 14 is adjusted so that the height of an intersecting point of first axis 40 and second axis 44 is generally equal to the height of the pivoting center of upper arm 30. Obviously, the jig fixing the workpiece may be directly positioned on a floor without using the positioner. However, even in this case, the robot may be mounted on the pedestal so as to properly adjust the height of the robot.

As shown in the front view (the lower-left view) of FIG. 2, in relation to the horizontal positional relationship between robot 12 and positioner 78, a center axis 86 of the operating range in the horizontal direction of robot 12 generally coincides with a center axis 88 of jig 76 or workpiece 80, so that the weldable range of the robot becomes maximum. As shown in the top view (the upper-right view) of FIG. 2, jig 76 and workpiece 80 are positioned close to robot 12 as possible, so that the operating range of robot 12 may cover the welding area of the workpiece even when the workpiece is relatively large. In this case, as the positioner fixing workpiece 80, a positioner, as disclosed in Japanese Unexamined Patent Publication (Kokai) No. 2006-341283 filed by the same applicant of this application, may be used. Due to such a positioner, the orientation of the fixed workpiece may be changed about two mutually orthogonal axes, and thus a more preferable welding cell may be constituted by the positioner in which the workload of the robot may be reduced.

As shown in FIG. 2, rotating body 26 is rotated by 90 degrees from the state of FIG. 1, so that robot 12 can easily approach workpiece 80. Due to this, a slack of conduit 56 at the front side (or the workpiece side) may be minimized, whereby conduit 56 is prevented from interfering with the other components while having a certain or more bend radius, even when robot 12 is positioned close to positioner 78. In other words, although rotating body 26 normally has the operating range of ±180 degrees, the area to be welded is within ±90 degrees in front of the robot of the arc robot system in most cases. Therefore, the operating range of the rotating body cannot be insufficient due to the above configuration. Since the conduit is arranged near the lateral side (not the front side) of the rotating body while keeping a required minimum bend radius, the robot may be positioned close to the workpiece while the welding wire is stably fed. Obviously, the rotating body may be arranged in the state that the rotating body is rotated by −90 degrees or +45 degrees. As such, the degree-of-freedom of the arrangement of the robot is high in the invention, thus an optimum arc welding robot system may be arranged.

Figure 3:
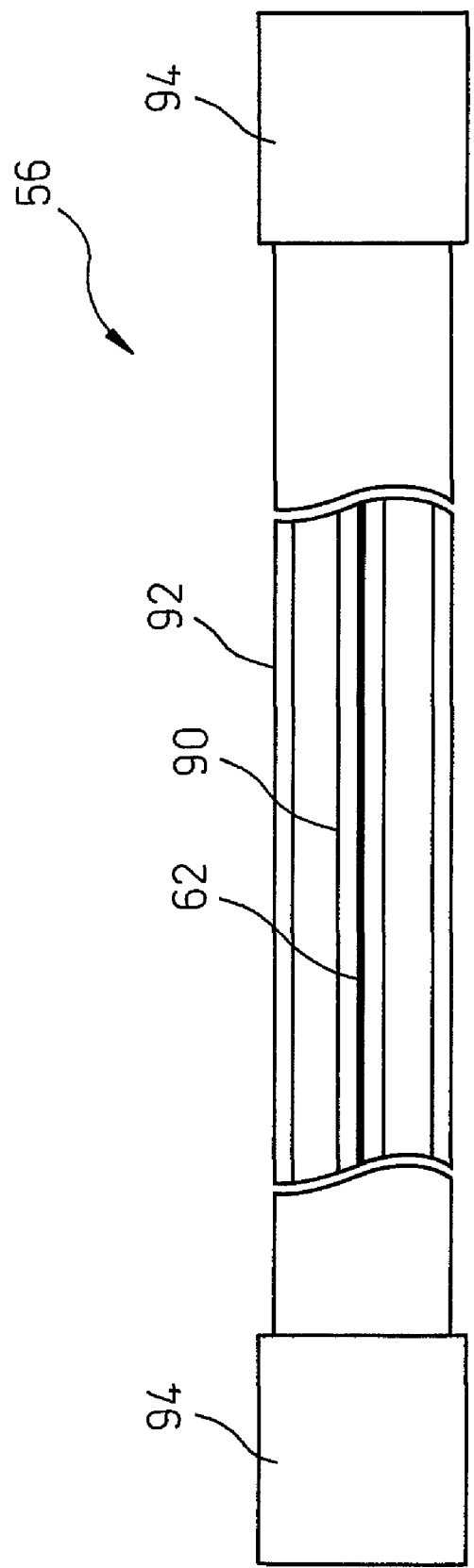
FIG. 3 is a view showing the structure of a welding wire conduit used in the robot of FIG. 1.

FIG. 3 shows the constitution of conduit 56. Conduit 56 has a flexible wire liner 90 through which welding wire 62 extends, and a flexible conduit member 92, having an inner diameter larger than an outer diameter of wire liner 90, through which wire liner 90 extends. Conduit member 92 has connectors 94 attached both ends thereof. One of connectors 94 is connected to wire drum 54 (FIG. 1) and the other of connectors 94 is connected to wire feeder 52. When the conduit should be exchanged, cleaned or checked, the operator may approach the conduit from the outside of the robot arm and remove connectors 94 connected to the wire drum and the wire feeder, so as to detach the conduit. Therefore, the workability of the operator may be improved.

Since at least one of wire liner 90 and conduit member 92 are flexible and elastic, the conduit is configured to have a required minimum bend radius which is required to arrange the conduit in various patterns as described below. In other words, even when the operating range of the robot arm is large, the bend radius of the welding wire within the conduit may be kept more than a certain value, whereby the welding wire may be stably supplied to wire feeder.

Figure 4:
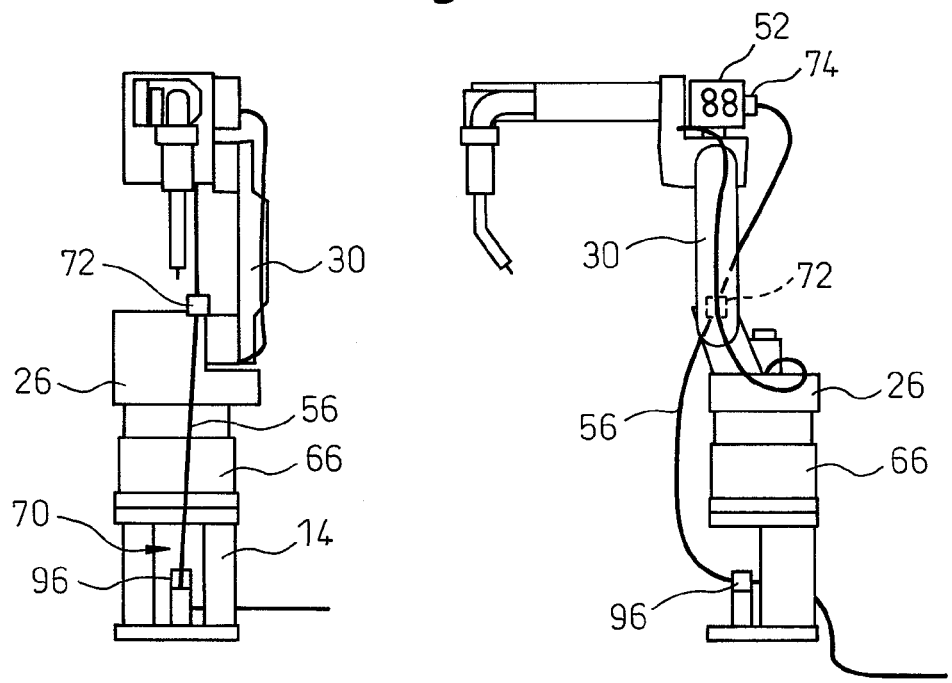
FIG. 4 shows front and side views of the arc welding robot in which a first support member is arranged near the rotation axis of a rotating body of the robot.

FIG. 4 shows front and side views of an example of the arc welding robot in which first support member 72 is arranged near the rotating axis of the rotating body. First support member 72 is positioned on the upper part of rotating body 26 near the rotating axis. Conduit 56 extends from the rear part of robot pedestal 14 and is supported by a second support member 96 arranged on pedestal 14 after passing through an opening or through hole 70 of the pedestal. In particular, second support member 96 has a through hole extending in the front-rear direction of pedestal 14, and conduit 56 is inserted in the through hole of second support member 96 and a portion of the conduit in the through hole is supported. Conduit 56 after passing through hole 70 is arranged near the front part of rotating body 26 and supported by first support member 72 on the upper part of rotating body 26, while keeping the required minimum bend radius. Conduit 56 after passing through first support member 72 is introduced to the rear side of upper arm 30 and connected to connector 74 at the rear side of wire feeder 52, while keeping the required minimum bend radius. At this point, first support member 72 and second support member 96 may hold conduit 56 so that the conduit may be slidable in the longitudinal direction thereof at each support member. In other words, conduit 56 extends near the front side of pedestal 14 while having a required bend radius before first support member 72 (or in the lower area), extends near the rear side of upper arm 30 while having a required bend radius after first support member 72 (or in the upper area), and then is connected to wire feeder 52, whereby the conduit arranged so as to present a generally S-shape on the whole. As such, the conduit has a certain margin in the vicinity of the first support member, whereby the conduit may follow the motion of the robot arm without being subjected to an undesired stress, even when the robot arm moves widely.

By arranging conduit 56 so as to present generally S-shape as described above, conduit 56 may easily follow the rotating motion of rotating body 26 in a region between bottom and top plate members of pedestal 14 (as explained below) which opens at toward the front side of the robot, and in a region extending from the above region between the bottom and top plate members to first support member 72. Generally, in an arc welding robot, the welding operation of an object is usually carried out on the front side of the robot. In the case that the motion range of the rotating body is equal to or more than ±120 degrees when the front of the robot corresponds to zero degree, such a rotating body may be applied to most of arc welding robot system. Therefore, it is not necessary to configure the rotating body so as to have the motion range of ±180 degrees.

In the arc welding robot of the invention, a suitable area for the conduit is arranged around each part of the robot, so that the conduit for the welding wire may have a sufficient length so as to follow the motion of the robot arm. Therefore, the welding wire within the conduit is not locally compressed against the inner wall of the conduit. Although the conduit is a consumable item which needs to be periodically exchanged, it is not necessary for the operator to insert the conduit into a narrow space such as a hollow portion of the rotating body during the maintenance or check of the conduit, because the conduit is arranged along the robot arm. Therefore, the operator may easily exchange the conduit by approaching the conduit from the outside of the robot arm.

Figure 5:
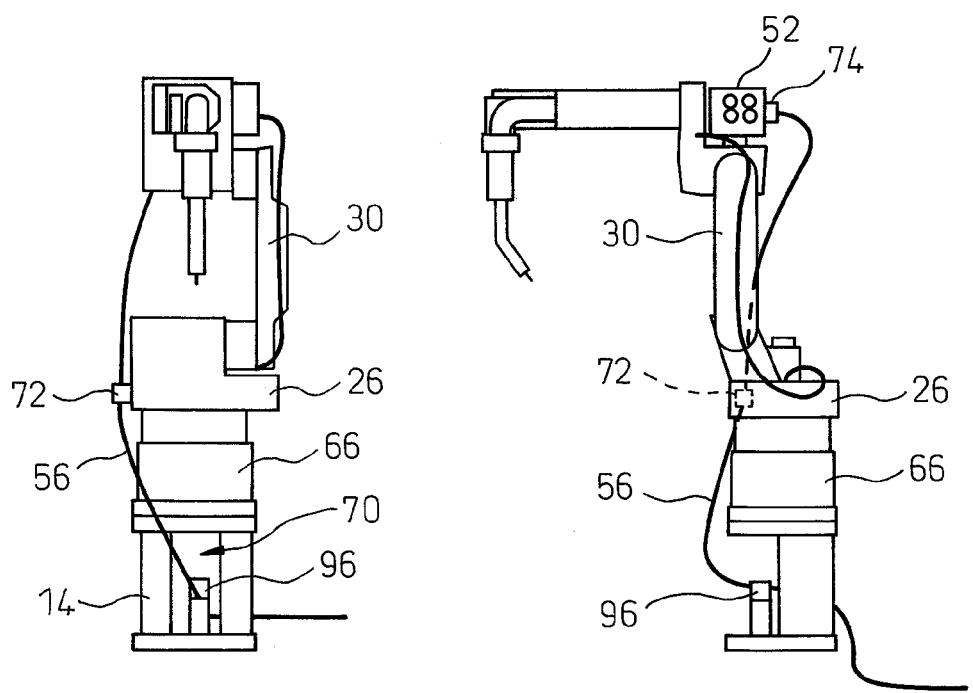
FIG. 5 shows front and side views of the arc welding robot in which the first support member is arranged on a part of the rotating body opposed to an upper arm of the robot.

FIG. 5, indicating a modification of FIG. 4, shows front and side views of an example of the arc welding robot in which first support member 72 is arranged on a part of rotating body 26 opposed to upper arm 30. Conduit 56 extends through opening 70 of pedestal 14 and second support member 96, is introduced obliquely upward to the front part of base 66 opposed to upper arm 30 of rotating body 26, and is supported by first support member 72. Conduit 56 after passing through first support member 72 is introduced obliquely upward to the rotating axis of rotating body 26 and is connected to connector 74 at the rear side of wire feeder 52 while keeping the required minimum bend radius. In the case of FIG. 5, when rotating body 26 is rotated to the position of −90 degrees (the robot arm is on the left side in the front view), first support member 72 is also rotated with the rotating body, whereby the conduit may be kept curved at the periphery of rotating body 26 and is not subjected to an undesirable stress due to the rotating motion. Similarly, when rotating body 26 is rotated to the position of +90 degrees (the robot arm is on the right side in the front view), first support member 72 is also rotated with the rotating body, whereby the conduit may be kept curved at the periphery of rotating body 26 and is not subjected to an undesirable stress due to the rotating motion.

In the configuration of FIG. 5, conduit 56, after passing through second support member 96, extends in front of body base 66 and the front side of rotating body 26, while being curved, and is introduced to first support member 72. When rotating body is rotated to −90 degrees as described above, taking into consideration that conduit 56 is already bent 90 degrees in the initial position, the conduit is subjected to a further bend stress. However, a certain area for the conduit is prepared in the height direction of the robot, the bend radius of the conduit cannot be considerably small. At this point, when each of first support member 72 and second support member 96 supports the conduit so that the conduit may be moved in the longitudinal direction thereof relative to each support member, the conduit may follow wider rotating motion of the rotating body. Concretely, when first support member 72 slidably support conduit 56, a shortage of margin of length between first support member 72 and second support member 96 may be compensated by the downward movement of conduit 56 relative to first support member 72. Further, when second support member 96 slidably support conduit 56, a shortage of margin of length between first support member 72 and second support member 96 may be compensated by the movement of conduit 56 toward first support member 72 relative to second support member 96.

Figure 6:
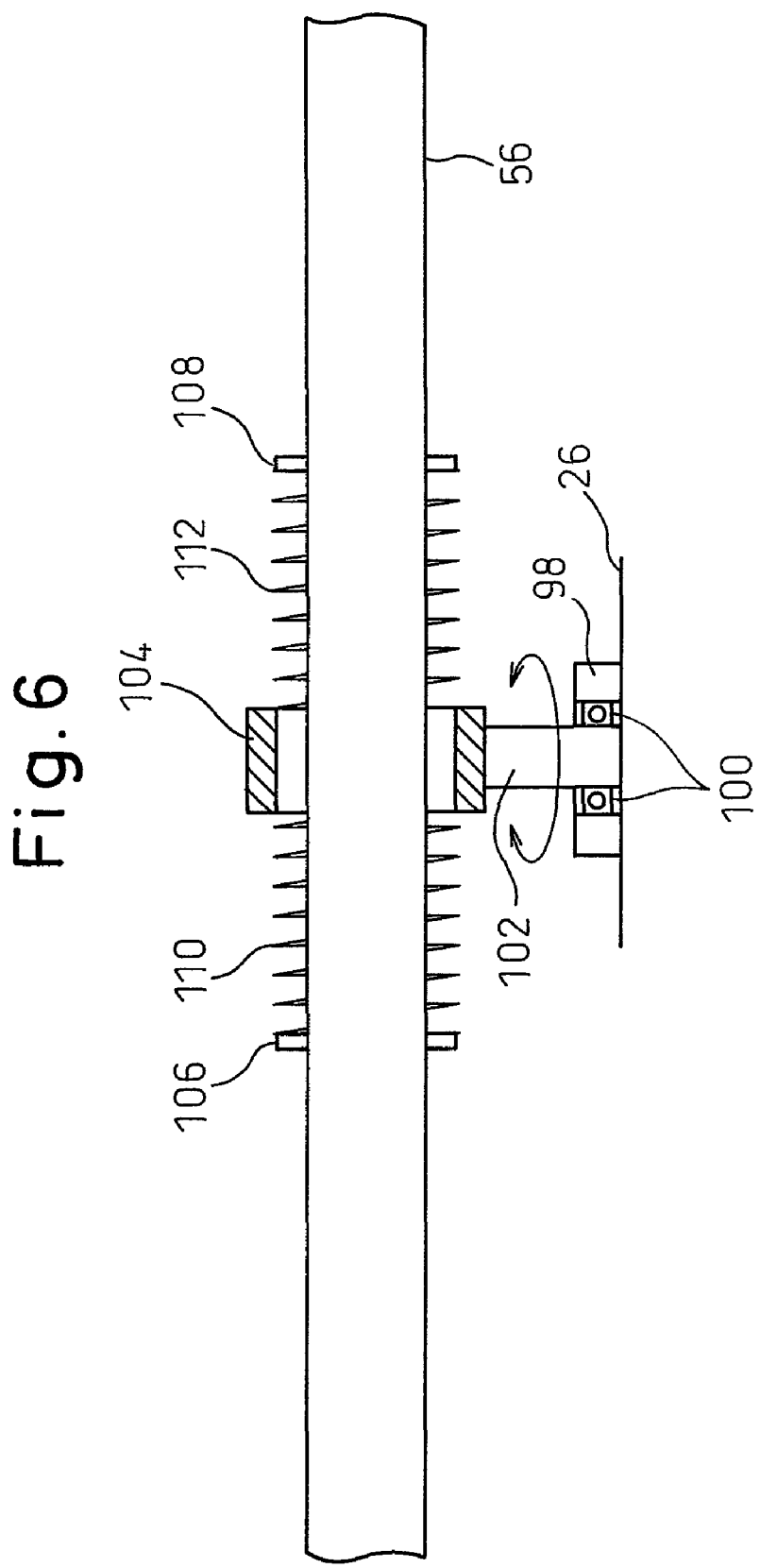
FIG. 6 is a view showing a concrete constitution of the first support member.

With reference to FIG. 6, the constitution, to allow the conduit to move in the longitudinal direction thereof relative to each support member, is explained. Although FIG. 6 shows first support member 72, the same can be applied to the second support member. As shown in FIG. 6, first support member 72 has an attachment 98 attached to rotating body 26 or the like, a rotatable shaft 102 one end of which is rotatably attached to attachment 98 by means of a bearing 100 or the like, and a conduit supporting portion 104, attached to the other end of shaft 102, having generally a ring-shape with an inner diameter larger than an outer diameter of conduit 56. At the outside sites of conduit 56 apart from both ends of conduit supporting portion 104 by a given length in the axial direction thereof, generally ring-shaped abutments 106 and 108 are arranged. Further, a coil spring 110 is positioned between abutment 106 and one end of conduit supporting portion 104, and a coil spring 112 is positioned between abutment 108 and the other end of conduit supporting portion 104. Due to such a constitution, conduit 56 may be moved in the longitudinal direction thereof while a certain position (generally an intermediate position between abutments 106 and 108) is the center of the movement and the upper limit of the movement corresponds to the distance between abutments 106 and 108. Further, the conduit may be rotated relative to rotating body 26 by means of rotatable shaft 102, whereby the degree-of-freedom of the motion of the conduit may be improved. In addition, a rubber band or a spring balancer may be used instead of the coil spring.

In the configurations of FIGS. 4 and 5, when the robot arm (at least one of the upper arm and the forearm) is moved, an undesirable stress caused by the motion of the robot arm is prevented from being applied to the conduit due to a margin of length of conduit 56 between first support member 72 and wire feeder 52. Since the conduit is obliquely extends around the robot as described above, the margin of length is easily obtained. Further, when each support member is rotatably arranged, the margin is more easily obtained, whereby the conduit can follow the wider motion of the robot. Due to such a configuration, a slack of the conduit around the body base and the front part of the rotating body may be reduced and the same effect as the case of FIG. 2 may be obtained.

Figure 7:
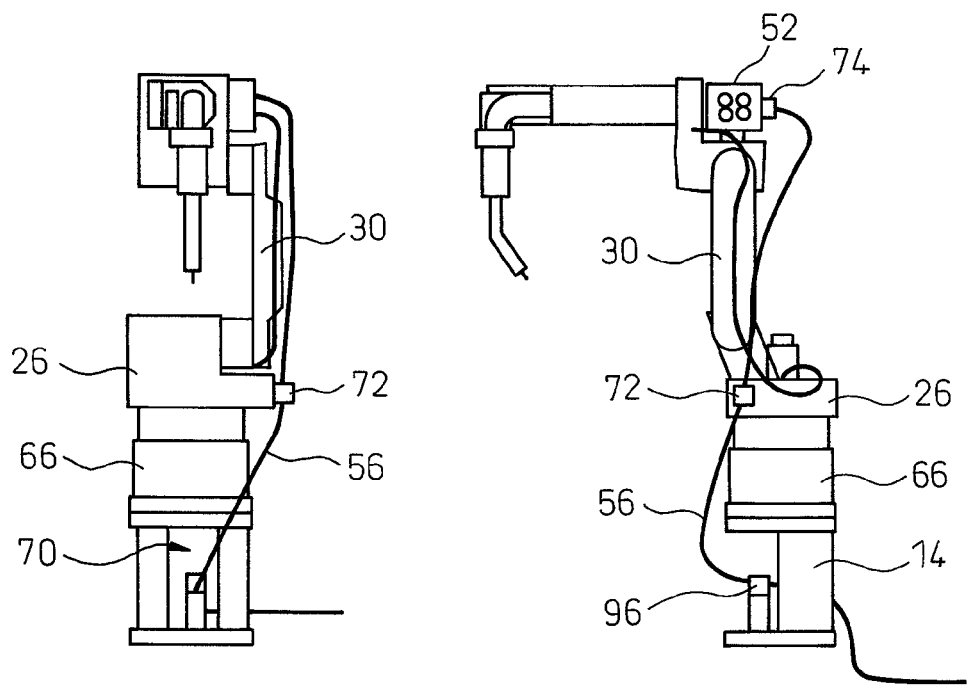
FIG. 7 shows front and side views of the arc welding robot in which the first support member is arranged on a part of the rotating body near the upper arm of the robot.

FIG. 7 shows front and side views of the arc welding robot in which the first support member is arranged on a part of the rotating body near the upper arm of the robot. First support member 72 is arranged on a part of rotating body 26 near upper arm 30. Conduit 56 extends through opening 70 of pedestal 14 and second support member 96, is introduced obliquely upward toward upper arm 30 of rotating body 26, while passing near the front side of body base 66, and is supported by first support member 72, whereby the conduit may follow the motion of rotating body 26. Conduit 56 after passing through first support member 72 is introduced obliquely upward to the rotating axis of rotating body 26 and is connected to connector 74 at the rear side of wire feeder 52 while keeping the required minimum bend radius. At this point, conduit 56 is arranged outside of control cable 16 extending generally parallel to conduit 56, in order to avoid interference between conduit 56 and control cable 16. When rotating body 26 is rotated to the position of +90 degrees, taking into consideration that conduit 56 is already bent 90 degrees in the initial position, the conduit is subjected to a further bend stress. However, a certain area for the conduit is prepared in the height direction of the robot, the bend radius of the conduit cannot be considerably small. Further, when each of first support member 72 and second support member 96 supports the conduit so that the conduit may be moved in the longitudinal direction thereof relative to each support member, or when the first and second support members 96 are rotatably arranged on rotating 26 and pedestal 14, respectively, a shortage of margin of length may be compensated, as described in the case of FIG. 5.

Figure 8:
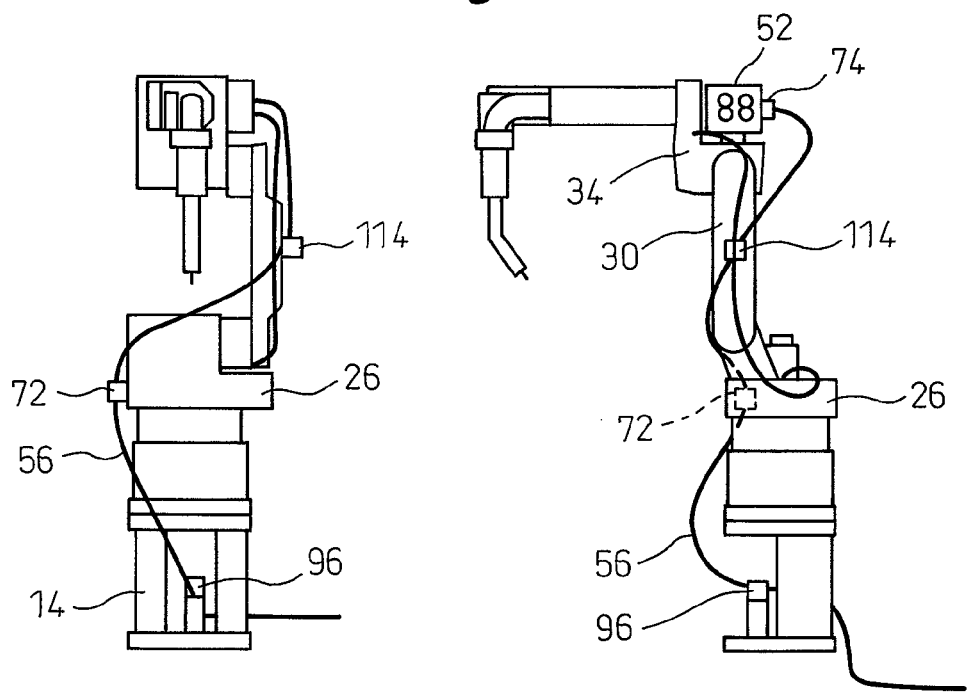
FIG. 8 shows front and side views of the arc welding robot in which the first support member is arranged on a part of the rotating body opposed to the upper arm of the robot and a third support member is arranged on the upper arm.

FIG. 8 shows front and side views of the arc welding robot in which the first support member is arranged on a part of the rotating body opposed to the upper arm of the robot and a third support member is arranged on the upper arm. The configuration of FIG. 8 is the same as the configuration of FIG. 5 except for a third support member 114 arranged on upper arm 30. Conduit 56 after passing through first support member 72 is supported by third support member 114, preferably slidably in the longitudinal direction thereof, before being connected to wire feeder 52. Due to this, a part of conduit 56 between first support member 72 and third support member 114 may follow the motion of upper arm 30, another part of conduit 56 between third support member 114 and connector 74 of wire feeder 52 may follow the motion of forearm 34, whereby the motion of the conduit is easily predicted. Further, when each of first support member 72 and second support member 96 supports the conduit so that the conduit may be moved in the longitudinal direction thereof relative to each support member, or when the first and second support members 96 are rotatably arranged on rotating 26 and pedestal 14, respectively, a shortage of margin of length may be compensated, as described in the case of FIG. 5.

Figure 9:
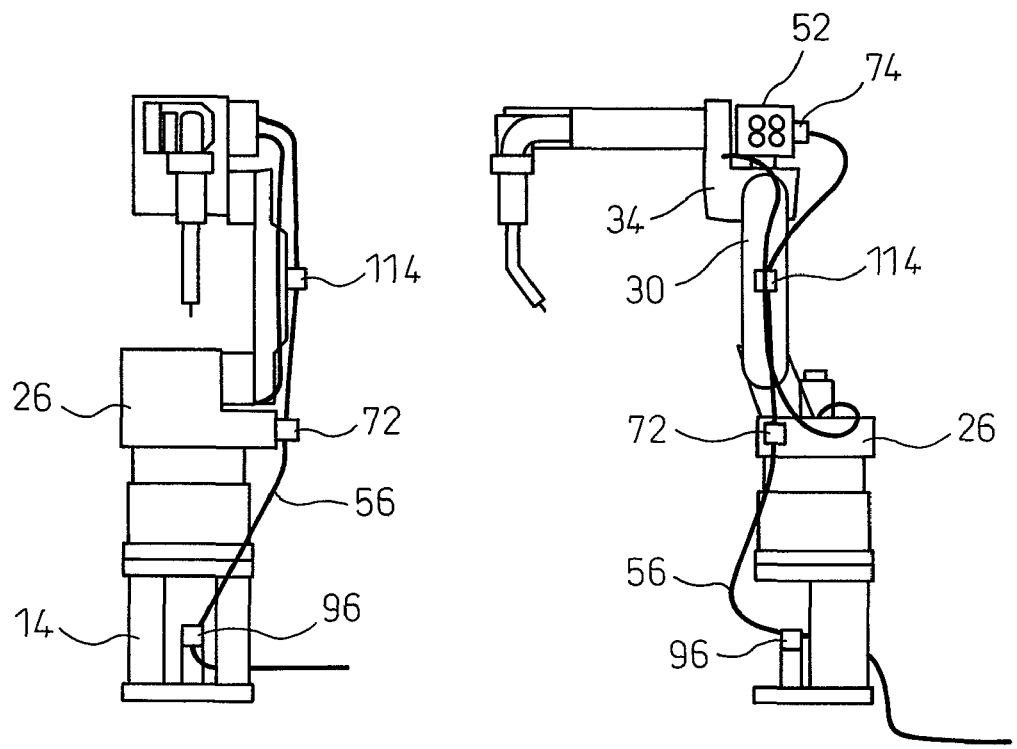
FIG. 9 shows front and side views of the arc welding robot in which the first support member is arranged on a part of the rotating body near the an upper arm of the robot and the third support member is arranged on the upper arm.

FIG. 9 shows front and side views of the arc welding robot in which the first support member is arranged on a part of the rotating body near the an upper arm of the robot and the third support member is arranged on the upper arm. The configuration of FIG. 9 is the same as the configuration of FIG. 8, except for the position of the first support member. Due to this, a part of conduit 56 between first support member 72 and third support member 114 may follow the motion of upper arm 30, another part of conduit 56 between third support member 114 and connector 74 of wire feeder 52 may follow the motion of forearm 34, whereby the motion of the conduit is easily predicted. Further, when each of first support member 72 and second support member 96 supports the conduit so that the conduit may be moved in the longitudinal direction thereof relative to each support member, or when the first and second support members 96 are rotatably arranged on rotating 26 and pedestal 14, respectively, a shortage of margin of length may be compensated, as described in the case of FIG. 5.

Figure 10C:
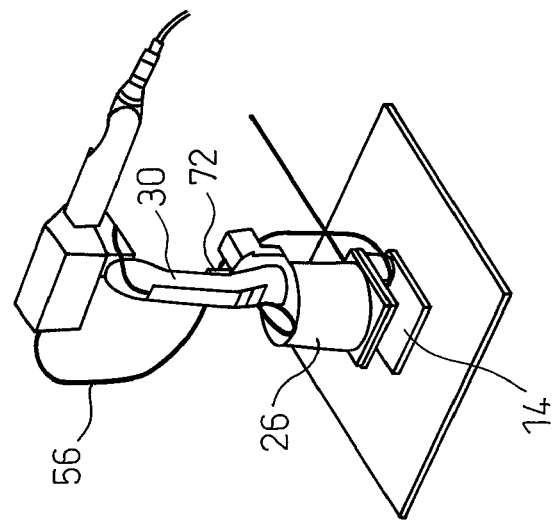
FIG. 10c is a view showing the motion of the conduit when the rotating body of the robot of FIG. 4 is rotated from the reference position by +90 degrees.
Figure 10B:
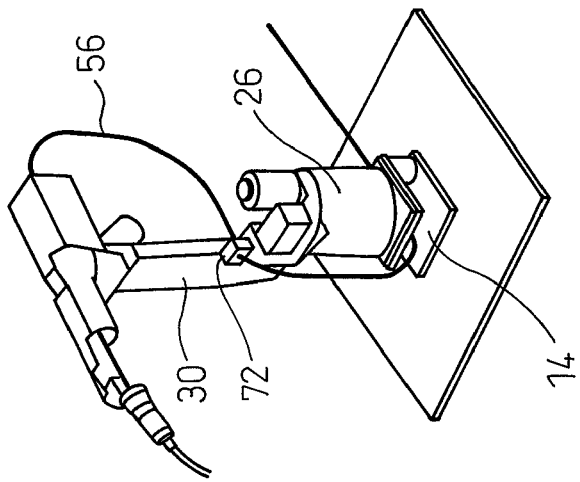
FIG. 10b is a view showing the motion of the conduit when the rotating body of the robot of FIG. 4 is positioned at the reference position.
Figure 10A:
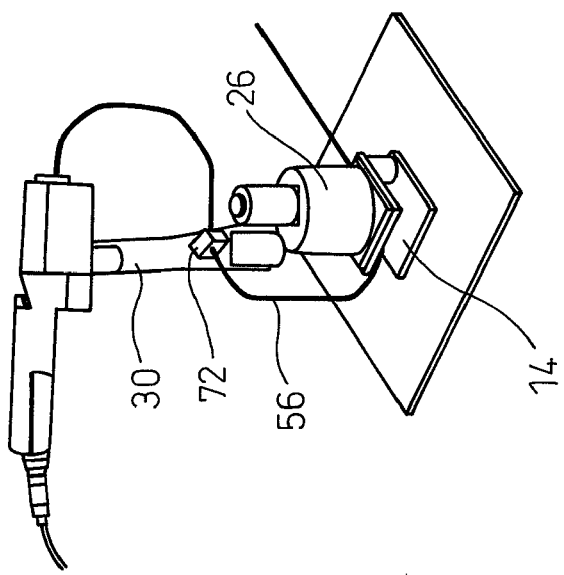
FIG. 10a is a view showing the motion of the conduit when the rotating body of the robot of FIG. 4 is rotated from a reference position thereof by −45 degrees.

FIGS. 10a to 10c are views showing the motion of the conduit when the rotating body of the robot of FIG. 4 is rotated by various degrees. Upper arm 30 of FIGS. 10a to 10c is formed as a mirror-image configuration of the upper arm of FIG. 4 relative to rotating body 26. The position of rotating body 26 where the rotation angle of rotating body 26 is zero degree (FIG. 10b) is referred to as a reference position, and the positions of FIGS. 10a and 10c mean −45 degrees and +90 degrees, respectively, when the clockwise direction viewed from the above means a minus direction. As shown in FIG. 10a, conduit 56 after passing through the hole of robot pedestal 14 is pulled out from the front side of pedestal 14 while being bent to the left side by the motion of rotating body 26. Then, conduit 56 extends near the right-front side of rotating body 26 and is supported by first support member 72 arranged on the upper part of rotating body 26. Although conduit 56 is bent by the motion of rotating body 26, the bend stress may be moderated by a part of conduit 56 between robot pedestal 14 and first support member 72.

On the other hand, when rotating body 26 is rotated by +90 degrees (FIG. 10c), conduit 56 after passing through the hole of robot pedestal 14 is pulled out from the front side of pedestal 14 while being bent to the right side by the motion of rotating body 26. Then, conduit 56 extends near the left-front side of rotating body 26 and is supported by first support member 72 arranged on the upper part of rotating body 26. Although conduit 56 is bent by the motion of rotating body 26, the bend stress may be moderated by a part of conduit 56 between robot pedestal 14 and first support member 72.

FIGS. 11a to 11c show the motion of the conduit when the upper arm of the robot of FIG. 9 is rotated. When third support member 114 is arranged on upper arm 30, first support member 72 is positioned on the front side of rotating body 26 so that the operating range of the upper arm may become wider. The position of upper arm 30 where the rotation angle of the upper arm is zero degree (or the longitudinal direction of the upper arm is vertical, as shown in FIG. 11b) is referred to as a reference position, and the positions of FIGS. 11a and 11c mean −90 degrees and +90 degrees, respectively, when the clockwise direction viewed from the lateral side means a minus direction. As shown in FIG. 11a, conduit 56 pulled out from first support member 72 extends near the front side of rotating body 26, is introduced to the lower part of upper arm 30 and is supported by third support member 114. The bend stress caused by the motion of upper arm 30 may be moderated by a margin of length of conduit 56 between first support member 72 and third support member 114.

On the other hand, when upper arm 30 is rotated by +90 degrees (FIG. 11c), conduit 56 pulled out from first support member 72 extends near the front side of rotating body 26, is introduced to the lower part of upper arm 30 and is supported by third support member 114. The bend stress caused by the motion of upper arm 30 may be moderated by a margin of length of conduit 56 between first support member 72 and third support member 114.

Since forearm 34 is usually linked with upper arm 30, when upper arm 30 is moved, the position or the orientation of forearm 34 is also changed relative to the installation surface of the robot. FIGS. 11a to 11c indicate an example in which the orientation of forearm 34 is not changed even when upper arm 30 is moved. As a result, a relative angle between upper arm 30 and forearm 34 is varied. However, in any of the cases of FIGS. 11a to 11c, the stress of the conduit caused by changing the relative angle between the arms may be moderated due to a margin of length of the conduit between third support member 114 and connector 74 at the rear side of wire feeder 52.

FIGS. 12a to 12c show the motion of the conduit when the upper arm and the forearm have various orientations in the similar configuration of FIGS. 11a to 11c. Concretely, FIGS. 11a to 11c The orientations of forearm 34 as shown in FIGS. 11a to 11c are referred to as reference orientations, and the orientations of FIGS. 12a and 12c mean +180 degrees, −90 degrees and +90 degrees from the reference orientations, respectively, when the clockwise direction viewed from the above means a minus direction. The function of each component may be generally the same as the example of FIGS. 11a to 11c, and thus a detailed explanation thereof is omitted. In any cases, the stress of the conduit caused by the motions of upper arm 30 and forearm 34 may be moderated by a part of conduit 56 between third support member 114 and connector 74 at the rear side of wire feeder 52.

FIGS. 13a to 13d show a concrete example of robot pedestal 14. Robot pedestal 14 has a bottom plate member 116, two column members 118 positioned on bottom plate member 116 and separated from each other by a certain distance, and a top plate member 120 attached to upper ends of two column members 118. Bottom plate member 116 has at least one (four in the embodiment) through hole 122, and the robot pedestal is fixed to the installation surface by means of a bolt or the like inserted into each through hole. In order that the conduit may follow the motion of the rotating body, it is preferable that the column member has an inner surface as large as possible and the front wall of the pedestal having an opening is positioned as near as possible to the rear side of the robot. On the other hand, the robot pedestal must have a sufficient rigidity as a pedestal for the robot. In the illustrated embodiment, inside corners of each column member (or corners facing another column) are chamfered or rounded, whereby the motion range of the conduit becomes wider and the bend radius of the conduit is not locally minimized.

Figure 13C:
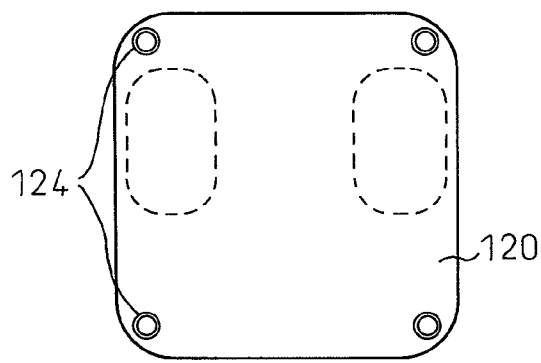
Figure 13D:
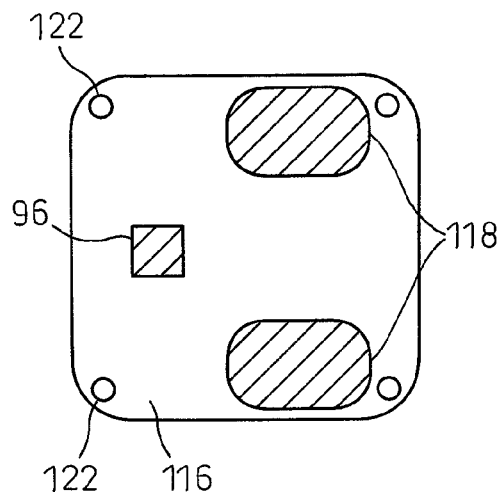
FIG. 13d is a sectional view along a d-d line of FIG. 13b.
Figure 13A:
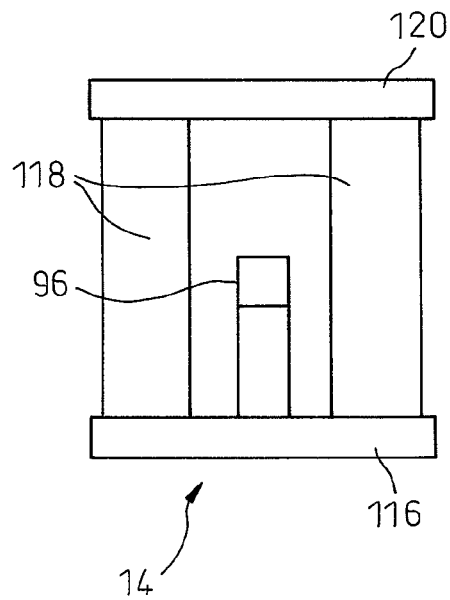
FIG. 13a is a front view of a pedestal of the arc welding robot.
Figure 13B:
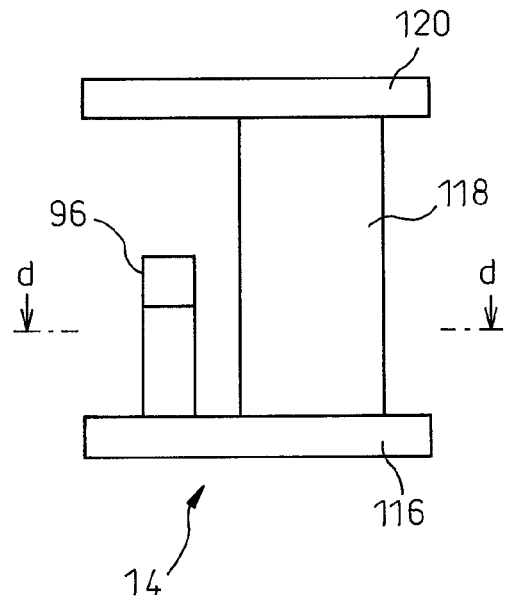

As shown in FIG. 13b, column members 118 are offset from rotating axis 28 (FIG. 1) of the rotating body of the robot toward the rear side (the right-side in FIG. 13b) of the robot. The conduit from the wire supply enters between the column members from the offset side.

Upper plate member 120 has at least one (four in the embodiment) tapped holes 124 for mounting the robot, and the robot is fixed to the upper plate member by means of a bolt or the like inserted into a through hole (not shown) of the robot body base and the tapped hole. Four corners of the upper plate member are chamfered or rounded, whereby the conduit may be arranged as inward as possible and the bend radius of the conduit is not locally minimized. The similar configuration may be applied to the body base and the rotating body of the robot. In addition, second support member 96 as described above is arranged within the robot pedestal (in the illustrated embodiment, fixed to bottom plate member 116).

According to the arc welding robot of the invention, when a robot is used as an arc welding system, a robot pedestal is provided in order to effectively utilize the operating range of the robot by adjusting the height of the robot to a workpiece to be welded. By inserting a conduit for a welding wire into the pedestal and connecting to a wire feeder so that the conduit presents a generally S-shape while having a certain bend radius, the conduit may stably follow the motion of the robot arm and moderate the stress caused by the motion of the robot arm. Further, maintenance of the arc welding robot may be easily carried out.

By connecting the conduit to the wire feeder while supporting the conduit at the position offset toward the opposite side of the upper arm from by a certain distance, viewed from the front side of the robot, the conduit may have a margin of length, corresponding to the offset distance, for accommodating the motion of the upper arm and the forearm. Therefore, the conduit may follow the motion of the robot while having the larger bend radius.

By supporting the conduit by means of a second support member arranged on the pedestal, if an undesirable force is applied to the conduit between the pedestal and the wire supply, a part of the conduit between the first and second support members cannot be affected.

By supporting the conduit by means of a third support member at the upper arm, a part of the conduit between the first and third support members may follow the motion of the upper arm in the front-rear direction, the other part of the conduit between the third support member and the wire feeder may follow the motion of the forearm in the front-rear direction. Further, a part of the conduit, in a region between the bottom and top plate members of the pedestal which opens at toward the front side of the robot, and in a region extending from the above region between the bottom and top plate members to the first support member arranged on the rotating body, may follow the motion of the rotating body. Therefore, the conduit may follow the three motions, i.e., the rotation of the rotating body, the pivoting of the upper arm and the pivoting of the forearm, by means of respective three divided parts of the conduit, whereby the motion of the cables becomes stable and a life of the cable may be easily predicted.

At least one of the first, second and third support members may slidably support the conduit in the longitudinal direction thereof, whereby a margin of length of the conduit in each part may be adjusted. Therefore, even when the margin of length of the conduit is shortened by the motion of the rotating body, the upper arm and/or the forearm, the conduit may be pulled out from the wire supply as needed, whereby the conduit may follow the wider operating range of the robot.

By positioning the column members of the pedestal at the rear side relative to the rotation axis of the rotating body, the conduit may follow the rotation range of the rotating body within ±90 degrees when the front of the robot corresponds to zero degree, the rotation range being applied to most of the arc welding robot system.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. An arc welding robot comprising:
   a robot pedestal;
   a rotating body rotatably mounted on the robot pedestal;
   an upper arm pivotally connected to the rotating body;
   a forearm which is pivotally connected to the upper arm;
   a wire feeding device for feeding welding wire, positioned at a rear part of the forearm;
   a welding torch for carrying out welding, attached to a front part of the forearm;
   a welding wire supply positioned around the robot; and
   a wire conduit connected between the welding wire supply and the wire feeding device, the welding wire being inserted into the wire conduit,
   wherein the robot pedestal comprises a bottom plate member arranged on an installation surface; two column members positioned on the bottom plate member and separated from each other by a certain distance; and a top plate member attached to upper ends of the two column members, the rotating body of the robot being fixed to the top plate member, wherein the two column members are connected to the bottom plate member and the top plate member, and the two column members cooperatively form a through hole, whereby the conduit extending from the welding wire supply may be fed toward a rotation axis of the rotating body through the through hole, wherein the conduit fed into one side of the through hole formed by the two column members is withdrawn from the other side of the through hole, is supported by a first support member arranged on an outside of the rotating body, and then is connected to the wire feeding device so as to present a generally S-shape, wherein the two column members are connected between the bottom plate member and the top plate member at a place where the two column members are offset toward the one side of the through hole from the rotation axis of the rotating body of the robot, wherein the first support member is arranged on a part of the rotating body opposed to the upper arm, wherein the conduit is further supported by a second support member arranged on the robot pedestal, and wherein the conduit, after passing through the second support member, extends in front of the rotating body, while being curved, is introduced to the first support member.

2. An arc welding robot comprising:
a robot pedestal;
a rotating body rotatably mounted on the robot pedestal;
an upper arm pivotally connected to the rotating body;
a forearm which is pivotally connected to the upper arm;
a wire feeding device for feeding welding wire, positioned at a rear part of the forearm;
a welding torch for carrying out welding, attached to a front part of the forearm;
a welding wire supply positioned around the robot; and
a wire conduit connected between the welding wire supply and the wire feeding device, the welding wire being inserted into the wire conduit, wherein the robot pedestal comprises a bottom plate member arranged on an installation surface; two column members positioned on the bottom plate member and separated from each other by a certain distance; and a top plate member attached to upper ends of the two column members, the rotating body of the robot being fixed to the top plate member, wherein the two column members are connected to the bottom plate member and the top plate member, and the two column members cooperatively form a through hole, whereby the conduit extending from the welding wire supply may be fed toward a rotation axis of the rotating body through the through hole, wherein the conduit fed into one side of the through hole formed by the two column members is withdrawn from the other side of the through hole, is supported by a first support member arranged on an outside of the rotating body, is supported by a third support member arranged on the upper arm, and then is connected to the wire feeding device so as to present a generally S-shape, wherein the two column members are connected between the bottom plate member and the top plate member at a place where the two column members are offset toward the one side of the through hole from the rotation axis of the rotating body of the robot, wherein the first support member is arranged on a part of the rotating body opposed to the upper arm, wherein the conduit is further supported by a second support member arranged on the robot pedestal, and wherein the conduit, after passing through the second support member, extends in front of the rotating body, while being curved, is introduced to the first support member.

3. An arc welding robot comprising:
a robot pedestal;
a rotating body rotatably mounted on the robot pedestal;
an upper arm pivotally connected to the rotating body;
a forearm which is pivotally connected to the upper arm;
a wire feeding device for feeding welding wire, positioned at a rear part of the forearm;
a welding torch for carrying out welding, attached to a front part of the forearm;
a welding wire supply positioned around the robot; and
a wire conduit connected between the welding wire supply and the wire feeding device, the welding wire being inserted into the wire conduit, wherein the robot pedestal comprises a bottom plate member arranged on an installation surface; two column members positioned on the bottom plate member and separated from each other by a certain distance; and a top plate member attached to upper ends of the two column members, the rotating body of the robot being fixed to the top plate member, wherein the two column members are connected to the bottom plate member and the top plate member, and the two column members cooperatively form a through hole, whereby the conduit extending from the welding wire supply may be fed toward a rotation axis of the rotating body through the through hole, wherein the conduit fed into one side of the through hole formed by the two column members is withdrawn from the other side of the through hole, is supported by a first support member arranged on an outside of the rotating body, is supported by a third support member arranged on the upper arm, and then is connected to the wire feeding device so as to present a generally S-shape, wherein the two column members are connected between the bottom plate member and the top plate member at a place where the two column members are offset toward the one side of the through hole from the rotation axis of the rotating body of the robot, wherein the first support member is arranged on a part of the rotating body near the upper arm, wherein the conduit is further supported by a second support member arranged on the robot pedestal, and wherein the conduit, after passing through the second support member, extends in front of the rotating body, while being curved, is introduced to the first support member.

4. The arc welding robot as set forth in claim 1, wherein the first and second support members are configured to support the conduit so that the conduit may be moved in the axial direction thereof in each support member.

5. The arc welding robot as set forth in claim 2, wherein the first, second and third support member are configured to support the conduit so that the conduit may be moved in the axial direction thereof in the third support member.

6. The arc welding robot as set forth in claim 3, wherein the first, second and third support member are configured to support the conduit so that the conduit may be moved in the axial direction thereof in the third support member.

* * * * *